July 16, 1963     J. F. PASIEKA     3,097,534
ACCELERATION INDICATOR
Filed Nov. 28, 1960
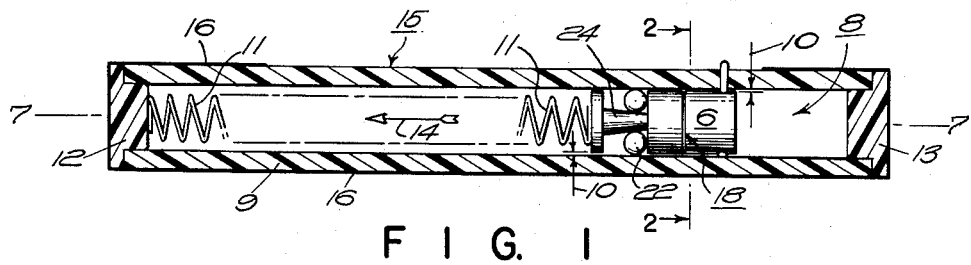
FIG. 1
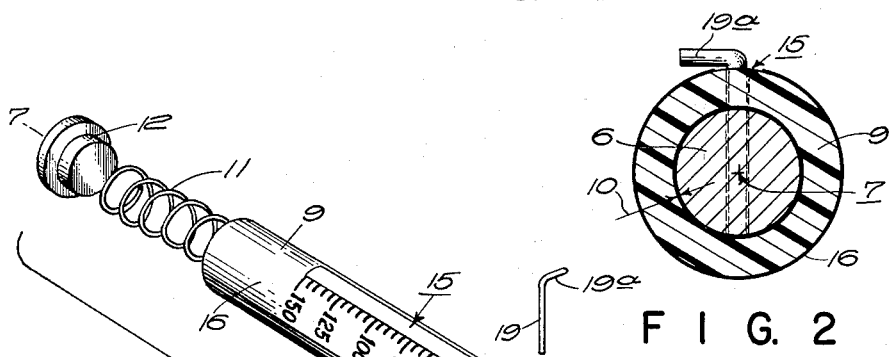
FIG. 2
FIG. 3
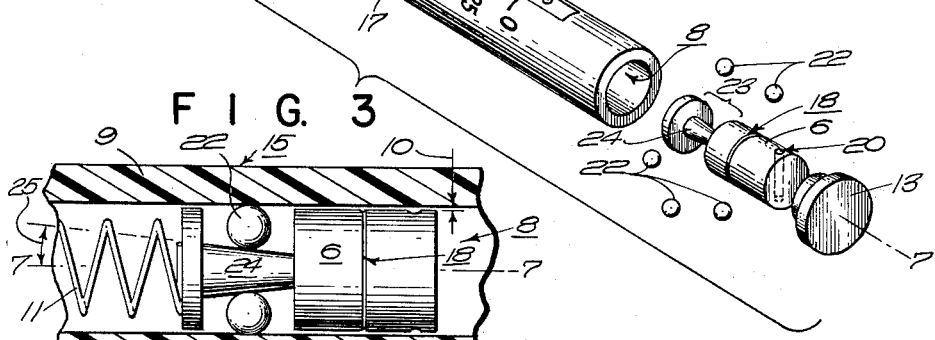
FIG. 4
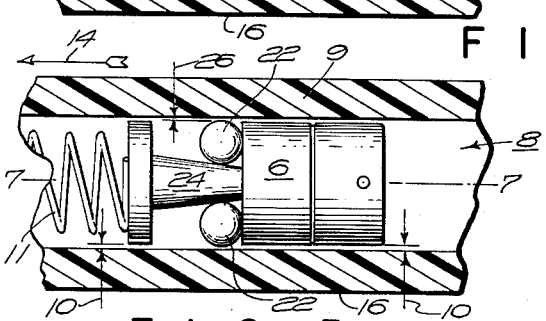
FIG. 5
*INVENTOR.*
JOHN F. PASIEKA
BY
*Dike, Thompson & Bronstein*
ATTORNEYS United States Patent Office 3,097,534
Patented July 16, 1963

3,097,534
ACCELERATION INDICATOR
John F. Pasieka, South Acton, Mass., assignor of one-half to Raymond L. Renner, Cochituate, Mass.
Filed Nov. 28, 1960, Ser. No. 71,929
2 Claims. (Cl. 73—492)

The present invention relates to improvements in measurement of forces of acceleration, shock, impact, and the like and, in one particular aspect, to an improved maximum acceleration indicator of high precision which lends itself to miniaturization and manufacture at low cost.

Acceleration-responsive devices are known in a variety of constructions custom-designed to serve such diverse purposes as the continuous measurement of instantaneous accelerations, or of vibration, and the signalling or triggering of an indication that a predetermined acceleration has been encountered. Whether in the nature of vibration meters, seismometers, or accelerometers, such devices commonly employ a relatively massive inertia member suspended for measurable movement in relation to a support whenever acceleration forces are experienced, with directivity being achieved by limiting freedom of movement of the inertia member to a particular path. However, sensitivity and accuracy are lacking unless undesirable frictional restraints are overcome, and, to this end, the movable-mass devices have generally assumed complex forms which either involve costly bearings or replace the usual bearings with intricate frictionless suspension spring assemblies.

For some purposes, only maximum acceleration forces are of interest. Such information discloses whether or not certain tolerances of shock or vibration have been exceeded, for example, and, consequently, whether or not there is unobvious structural damage or impaired life expectancy in apparatus which has experienced such forces. Measurements of this character may be important in evaluation of aircraft, or in connection with the shipment or use of delicate equipment. Preferably, such maximum acceleration devices should be small, light in weight, inexpensive and expendable, inasmuch as a large number may be required to perform the measurements at various positions in a single measurement installation and because their salvage for further use may not be practical. Accordingly, some economical maximum acceleration detectors are conveniently designed to be self-destructive, as by the breaking of a frangible window, to signal that a predetermined level of acceleration has been exceeded. But, in any event, the calibration must be precise if even this elementary signalling is to be reliable, and for the price of such precision it is desirable that the actual value of maximum acceleration be specifically indicated. According to the present teachings, an acceleration indicator which avoids the aforesaid difficulties and disadvantages is of the movable-mass type and provides the desired proportional measurements, but is nevertheless of such unique mechanical nicety and simplicity that it can be easily and economically manufactured with diminutive proportions to yield high operating accuracy and reliability.

Therefore, it is an object of the present invention to provide a novel and improved acceleration-responsive device of uncomplicated and low-cost construction which accurately measures accelerations in one direction along a sensing axis.

Another object is to provide a highly miniaturized and sensitive maximum acceleration indicator in which a small mass is both guided and automatically locked into maximum indication positions by a unique ball bearing assembly.

A still further object is to provide an improved accelerometer in which a shaped movable slug directly registers maximum acceleration in one direction and in which a restraining spring and guide bearing for the slug cooperate in producing a locking action needed for the indication of maximum accelerations.

By way of a summary account of practice of this invention in one of its aspects, a shaped mass which is to respond to acceleration effects is disposed within the interior of an elongated thin tubular casing in a uniform-diameter cylindrical passageway, the mass being of dimensions permitting sliding movement axially along the passageway with at least minute clearance in relation to the interior surfaces of the tubular casing. Preferably, the tubular casing is of transparent material, masked except along a narrow longitudinally-extending path forming a window through which an index marked upon the exterior of the mass may be viewed in relation to acceleration graduations marked upon the exterior of the casing. A helical coil spring possessing a predetermined force vs. deflection characteristic is also disposed coaxially within the casing, intermediate the movable mass and one of two end caps which close the cylindrical passageway. One section of the mass is formed as a slightly-tapered truncated conical section, having its central axis aligned with that of the passageway and bordered at each base by an integral enlargement, the tapering being in direction away from the spring. A number of bearing and caging balls are disposed about the conical section, caught loosely axially between the enlargements and confined radially between the conical surfaces and the inner cylindrical surfaces of the passageway. Taper angle and ball diameter are selected to insure that movement of the mass in the spring-compressing direction, responsive to accelerations in that direction, is guided with low friction by the bearing balls, and that attempted return motion in the opposite direction is restrained by firm automatic wedging of the balls between the outer surfaces of the conical section and inner surfaces of the casing passageway.

Although the features of this invention which are believed to be novel are set forth in the appended claims, the details of preferred embodiments and practices of the invention, as well as the further objects and advantages thereof, may be most readily comprehended through reference to the following description taken in connection with the accompanying drawings, wherein:

FIGURE 1 provides a longitudinal cross-sectioned view of a preferred embodiment of a miniature maximum acceleration indicator in which teachings of this invention are practiced;

FIGURE 2 is a transverse cross-section of the same apparatus, in an enlarged scale, taken along section line 2—2 in FIGURE 1;

FIGURE 3 presents an exploded pictorial view of the acceleration indicator of FIGURES 1 and 2;

FIGURE 4 is an enlarged longitudinal cross-section of a fragment of an accelerometer illustrating a wedging and caging condition of the movable mass assembly; and FIGURE 5 is an enlarged longitudinal cross-section of a fragment of an accelerometer illustrating a low-friction bearing action which occurs upon increase of acceleration.

A preferred accelerometer construction as portrayed in FIGURES 1 through 3 includes a seismic slug or mass 6 which is movable unidirectionally along an axis 7—7 within the hollow uniform-diameter cylindrical passageway 8 of a tubular casing 9. Mass 6 has an elongated and generally cylindrical outline complementing that of passageway 8, although their respective diameters differ slightly so that an annular clearance 10 of small thickness exists between them when they are coaxial. Helical coil springs 11, which has an accurately predetermined force vs. deflection characteristic, is also disposed within the tubular casing and extends fully between one end of the movable slug and one of the two fitted end cap or closure members 12 and 13 which are fixed with the casing and close the passageway 8. In this position, spring 11 resiliently restrains slug 6 against relative axial movement in the direction of arrow 14, except as such times as the force of the spring in its then-existing condition of deflection (compression) is overcome by an opposing force which results from either acceleration of the casing 9 in the direction opposite to that of arrow 14 or deceleration of the casing 9 in the direction of arrow 14. Casing 9 is formed of extruded or injection-molded transparent plastic material, preferably the latter such that the inner diameter can be maintained highly uniform and smooth. All but a narrow elongated window portion 15 of the casing is rendered opaque, by application of a masking paint 16 to the exterior surfaces, and a set of graduations and indicia 17 are marked in contrasting paint upon the exterior surfaces alongside the window 15 where they may be compared with a circumferential index 18 appearing about the slug 6 for purposes of registering maximum time rate of change of velocity experienced by the mass 6 in relation to casing 9 in direction 14.

For the purpose of maintaining the movable member 6 insensitive to accelerations until the unit is mounted in an intended measurement position, a removable locking pin 19 is passed through both a transverse opening 20 in member 6 and a transverse opening 21 in the tubular casing 9, with an end 19a projecting outwardly to facilitate its withdrawal. When released from this locking, the movable seismic member presents its circumferential index 18 opposite a neutral or zero marking on the scale of graduation 17, and, thereafter, accelerations experienced in the measurement direction 14 cause the indication to signify only the maximum value of such accelerations. Balls 22, which in the illustrated embodiment are five in number function both as bearings, to facilitate intended unidirectional motion of the seismic member and thereby to promote sensitivity and precision of the device, and as caging elements, to prevent movement of the seismic member in the opposite direction which would then prevent the device from characterizing only maximum acceleration. These bearing and caging balls are held in cooperative relationship with the mated casing and seismic member by partial confinement within a shaped portion 23 of the seismic member. Portion 23 is of reduced diameter in relation to the remainder of member 6, being specifically in the form of a thinner truncated conical section 24 the larger base of which is nearer the restraining spring such that the taper is in the same direction as the direction of forces applied to the seismic member by the spring. The diameter of balls 22 is less than the axial length of section 24, for purposes of permitting a slight movement needed for caging and uncaging further described later herein, and the diameter of the balls is also slightly greater than the smallest radial spacing between the surfaces of section 24 contacted by the balls and the outer cylindrical surfaces of seismic member 6.

As is shown in FIGURE 4, the taper angle 25 of reduced-diameter conical section 24 is relatively small, and is preferably between about two and ten degrees. The greater base diameter of this conical section, nearer spring 11, is sufficiently large in relation to the outer diameter of the seismic member 6 to permit the illustrated firm wedging of the balls 22 between the conical surfaces of this member and the cylindrical inner surfaces of casing 9. Such wedging takes place because of the thrust of spring 11, against member 6, which thrust thus causes the balls 22 to lock or cage the seismic member against movement in any but the intended single direction along axis 7—7.

Importantly, the one spring 11 therefore serves both to provide restraint for the seismic mass and to provide biasing which induces the caging action.

When acceleration occurs in the measurement direction, 14, in FIGURE 5, and is large enough to cause the seismic member 6 to further compress spring 11, the caging balls 22 are released from the wedged condition and permit the member 6 to move and take up an axial position characterizing the maximum value of the acceleration, whereupon the caging action once more occurs automatically and prevents member 6 from moving backward under the thrust from the spring. The minute backward slip which must occur before caging is completed is negligible, and in any event is substantially fixed in amount and is thus automatically compensated in the scale calibrations which register the maximum accelerations in terms of the maximum displacement less the minute axial slip. During its movement in response to acceleration in direction 14, seismic member tends to slide freely because of the small radial clearance 10 existing between it and the interior of casing 9, and further because of a ball-bearing action of balls 22 at such times. This is clarified by the FIGURE 5 illustration, representing the freed condition of the balls and indicating that their diameter is large enough to cause them to project radially outwardly beyond the circumference of the seismic mass when they are nearest the smaller base of conical section 24. Clearance 26 between the balls 22 and casing 9 being less than the clearance 10 between the member 6 and the casing, at least one of the balls will be disposed to make rolling contact with the interior of casing 9 during the acceleration-responsive movement, and member 6 thus does not tend to jam or to develop unacceptably high frictional restraint which would impair sensitivity and accuracy.

While a preferred construction includes a reduced-diameter conical section in the seismic member, which can be readily machined, the wedging section may alternatively take the form of a simple flat wedge rather than having a circular outline. Accordingly, the number of balls then used may also be different, it being required only that there be at least one such caging ball for each wedging surface. And, where it is desired that the bearing and/or caging action be further enhanced, a further conical or wedged section cooperating with a further set of bearing and caging balls, such as section 24 and balls 22, may be provided on the seismic member 6 at any convenient position axially displaced from that illustrated. Direction of taper of all such plural sections is then established in the same axial direction, of course, to promote the desired unidirectional effects. The simple helical compression spring 11 can be readily manufactured to possess a predetermined force vs. deflection characteristic, and is highly desirable for this reason, although other known forms of resilient members may be substituted. These may include springs which are placed under tension, rather than compression, when the measured accelerations take place, and the taper of the caging section on the associated seismic mass then obviously should be arranged to proceed in direction of the tension forces of the spring.

It should therefore be understood that the specific embodiment of this invention disclosed herein is intended to be of a descriptive rather than a limiting nature and that various changes, combinations, substitutions and modifications may be introduced in accordance with these teachings, without departing in spirit or scope from this invention in its broader aspects.

What I claim as new and desire to secure by Letters Patent of the United States is:

1. Acceleration-responsive apparatus comprising a tubular casing including transparent material and having a substantially cylindrical opening therethrough, an elongated mass member of generally cylindrical outline disposed within said opening with radial clearance for movement along the longitudinal axis of said opening responsive to acceleration having at least a component along said axis, end caps closing said opening, a spring within said opening resiliently biasing said mass member in one direction along said axis, said mass member having at least one caging section of reduced diameter and of truncated substantially conical form with the conical taper thereof in said one direction along said axis, a plurality of caging balls disposed about said conical caging section and confined axially and radially in relation to said mass member between outer surfaces of said reduced-diameter conical caging section and inner surfaces of said casing about said opening, said balls being of diameter greater than the least lateral spacing between said inner and outer surfaces and of diameter less than the greatest lateral spacing between said inner and outer surfaces, the diameter of said balls also being slightly in excess of the radial spacing between the outer periphery of said mass member and the points along said outer surfaces at which the balls contact said outer surfaces when they are in their innermost positions nearest the smaller base of said truncated conical section, whereby said balls tend to wedge between said inner and outer surfaces only when axially nearest the larger base of said truncated conical section, and whereby said balls tend to roll with low friction upon said inner surface of said tube when said balls are nearest said smaller base of said truncated conical section, an index on said mass member visible through the transparent material of said casing, and acceleration indicia distributed along said tubular casing, whereby registrations of said index with said indicia characterize maximum accelerations producing movements of said mass member relative to said casing in the direction opposite to said one direction along said axis.

2. Acceleration-responsive apparatus as set forth in claim 1 wherein the angle of said conical taper of said caging section is between about two to ten degrees in relation to said axis.

References Cited in the file of this patent

UNITED STATES PATENTS

| | | |
|---|---|---|
| 1,624,219 | Cowdrey | Apr. 12, 1927 |
| 2,163,847 | Perrey | June 27, 1939 |
| 2,392,308 | Brown | Jan. 8, 1946 |
| 2,446,445 | Dusen | Aug. 3, 1948 |
| 2,543,732 | Shultz | Feb. 27, 1951 |

FOREIGN PATENTS

| | | |
|---|---|---|
| 844,514 | Germany | July 21, 1952 |
| 373,170 | Great Britain | May 13, 1932 |
| 814,800 | Great Britain | June 10, 1959 |